United States Patent
Pan et al.

(10) Patent No.: US 7,414,971 B2
(45) Date of Patent: Aug. 19, 2008

(54) METHOD AND APPARATUS FOR RATE MATCHING IN A TELECOMMUNICATIONS SYSTEM

(75) Inventors: Guolin Pan, Westwood, MA (US); Anshoo Tandon, Bangalore (IN); Ravikumar Ramanathan, Bangalore (IN); Michael J. Lopez, Roslindale, MA (US)

(73) Assignee: Analog Devices, Inc., Norwood, MA (US)

( * ) Notice: Subject to any disclaimer, the term of this patent is extended or adjusted under 35 U.S.C. 154(b) by 765 days.

(21) Appl. No.: 10/934,112

(22) Filed: Sep. 3, 2004

(65) Prior Publication Data

US 2006/0050650 A1 Mar. 9, 2006

(51) Int. Cl.
*H04J 3/14* (2006.01)
*H04J 3/22* (2006.01)

(52) U.S. Cl. .................... 370/230.1; 370/235; 370/543; 370/545

(58) Field of Classification Search ........................ None
See application file for complete search history.

(56) References Cited

U.S. PATENT DOCUMENTS

| | | | | |
|---|---|---|---|---|
| 5,321,690 A | * | 6/1994 | Sato | 370/280 |
| 6,744,744 B1 | * | 6/2004 | Tong et al. | 370/320 |
| 6,956,909 B2 | * | 10/2005 | You et al. | 375/296 |
| 7,111,207 B2 | * | 9/2006 | Sakai | 714/701 |
| 2003/0051202 A1 | * | 3/2003 | Sakai | 714/763 |
| 2003/0099217 A1 | * | 5/2003 | Castor et al. | 370/335 |
| 2004/0146029 A1 | * | 7/2004 | Tong et al. | 370/335 |

OTHER PUBLICATIONS $3^{RD}$ Generation Partnership Project; Technical Specification Group Radio Access Network; Multiplexing and channel coding (FDD) (Release 1999), 3GPP TS 25.212 vd. 11.0 Sep. 26, 2002.

* cited by examiner

*Primary Examiner*—Chi H. Pham
*Assistant Examiner*—Soon D. Hyun
(74) *Attorney, Agent, or Firm*—Wolf, Greenfield & Sacks, P.C.

(57) ABSTRACT

A method converts an input data rate associated with N units of data to an output data rate associated with M units of data. The method includes calculating N write-control parameters each associated with one of M addresses of an output memory, directing each of N values of input data to an associated address of the output memory in response to the N calculated write-control parameters, and reading the output memory to provide output data associated with the output data rate. If N is greater than M, some of the N write-control parameters are associated with at least one shared address of the M addresses. If M is greater than N, all of the N write-control parameters are associated with different addresses of the M addresses. An apparatus is configured to implement this method.

24 Claims, 6 Drawing Sheets read_ptr[1] = 1, write_ptr[1] = 1 read_ptr[2] = 2, write_ptr[2] = 2 read_ptr[3] = 3, write_ptr[3] = 2 read_ptr[4] = 4, write_ptr[4] = 3 read_ptr[5] = 5, write_ptr[5] = 4 read_ptr[6] = 6, write_ptr[6] = 4 read_ptr[1] = 1, write_ptr[1] = 1 read_ptr[2] = 2, write_ptr[2] = 2 read_ptr[3] = 3, write_ptr[3] = 4 read_ptr[4] = 4, write_ptr[4] = 5 read_ptr[5] = 5, write_ptr[5] = 7 read_ptr[6] = 6, write_ptr[6] = 9

METHOD AND APPARATUS FOR RATE MATCHING IN A TELECOMMUNICATIONS SYSTEM

BACKGROUND OF INVENTION

1. Field of Invention

The invention relates to digital data transmission, and, more particularly, to apparatus and methods for data rate matching of transmissions in a telecommunications system.

2. Discussion of Related Art

Telecommunications systems must often accommodate mismatched data rates of different portions of the telecommunications pathway. For example, a transmitting unit may produce data having a different bit rate than the bit rate associated with a communication transiting a transmission medium. To accommodate the data rate mismatch, data delivered to the transmission medium has its rate modified to accommodate that required by the transmission medium. Similarly, data received from the transmission medium has its rate modified to that required for processing by a receiving unit. These processes of data rate conversion are typically called rate matching and de-matching respectively for a first data rate conversion process and a second conversion process that restores the original data rate.

Rate matching is commonly employed in mobile telephone communications systems. Such systems typically entail standards that affect rate matching processes, which in turn are established by industrial standards organizations. For example, in Europe, the European Telecommunications Standards Institute (ETSI) had original responsibility for the Universal Mobile Telecommunication System (UMTS) standardization process. In 1998, the Third Generation Partnership Project (3GPP) was formed to continue technical specification work, in part related to channel coding and multiplexing.

In the UMTS, higher layers assign a rate-matching attribute for each transport channel, and the attributes are changed through higher layer signaling. Knowledge of an attribute is used to calculate a number of bits to be repeated or punctured (removed) for a rate matching process. Moreover, the bit rate on a transport channel can vary between transmission time intervals.

For example, during an uplink transmission, a total bit rate after transport channel multiplexing is matched to a total channel bit rate of allocated dedicated physical channels. During an uplink, puncturing or repeating is performed to match the coded composite transport channel bit rate to the physical channel bit rate. Unfortunately, processing of data to change its bit rate can lead to inefficiencies in communication, such as transmission delay.

SUMMARY OF INVENTION

The invention arises, in part, from the realization that data-rate matching and de-matching in support of data transmission, such as in telecommunications systems, can be performed without conditional testing of each unit of data to determine if the bit must be punctured or repeated. Conditional testing can be eliminated by directing every input data value, such as every bit of data, to an output memory from which data is read at the output data rate. Thus, for example, the rate matching pattern scheme of the UMTS technical standard can have its efficiency increased by elimination of a conditional test for each incoming bit.

Accordingly, in a first aspect, the invention features a method for converting an input data rate associated with N units of data to an output data rate associated with M units of data. The method includes calculating N write-control parameters each associated with one of M addresses of an output memory, directing each of N values of input data to an associated address of the output memory in response to the N calculated write-control parameters, and reading the output memory to provide output data associated with the output data rate. If N is greater than M, some of the N write-control parameters are associated with at least one shared address of the M addresses. If M is greater than N, all of the N write-control parameters are associated with different addresses of the M addresses.

In a second aspect, the invention features an apparatus configured to implement the above-described method.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
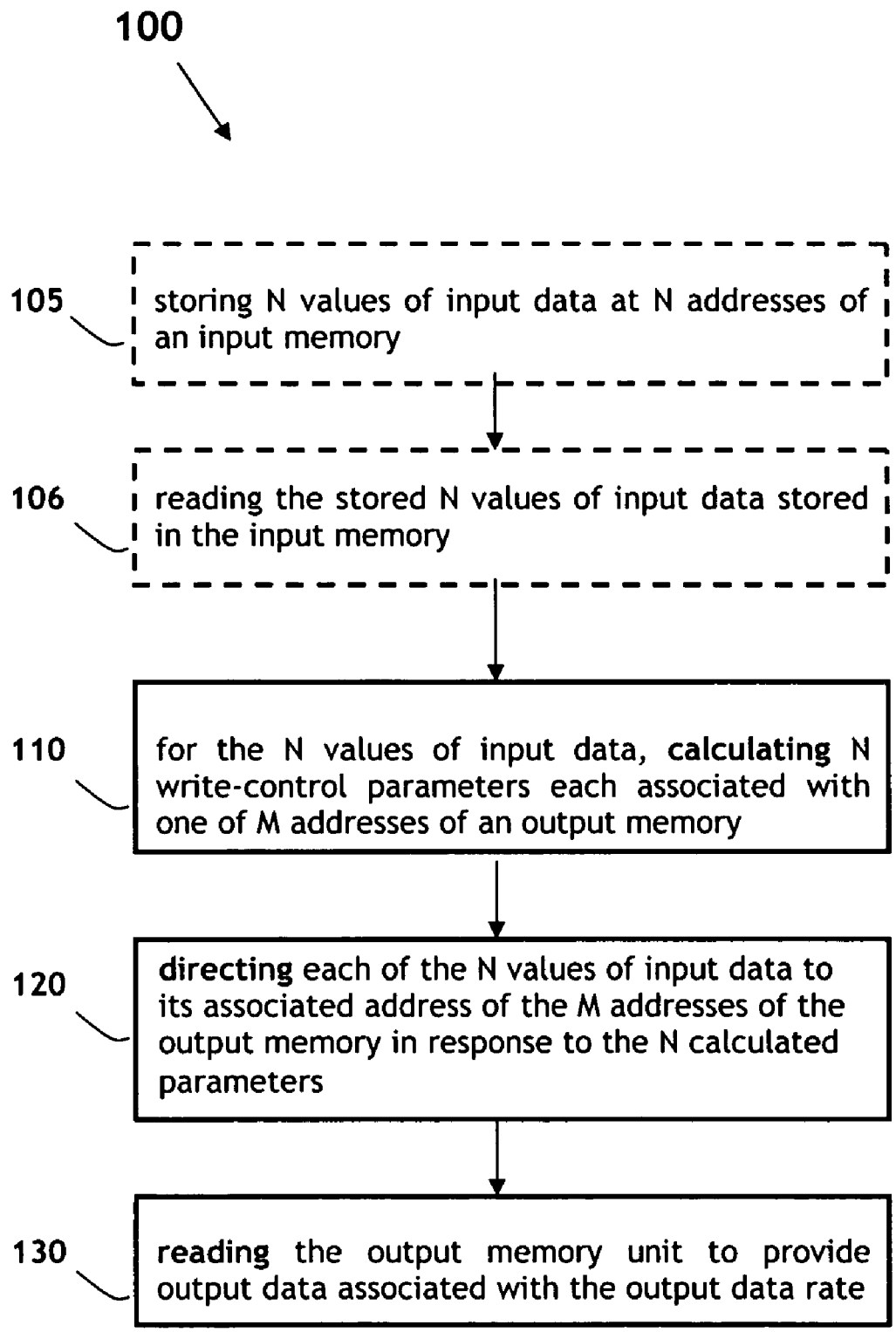
FIG. 1 is a flowchart of an embodiment of a method for converting an input data rate associated with N units of data to an output data rate associated with M units of data, according to principles of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The word "register" is used herein to refer to a data memory, or portion of a data memory. A register may hold, for example, a computer instruction, a storage address, or any kind of data (such as a bit sequence or individual characters.) The data memory may be located in, for example, a register file, a microprocessor, off-processor cache, random-access memory, disk-based memory or other storage media memory.

The word "bit" is used herein to refer to a unit of information equivalent to the result of a choice between two alternatives. The word "bit" is also used herein to refer to a portion of a register that can store data in the form of bits. A bit can assume values of 1 and 0, other integral values, or can assume a soft value, for example, a non-integral value.

FIG. 1 is a flowchart of an embodiment of a method 100 for converting an input data rate associated with N units of data to an output data rate associated with M units of data, according to principles of the invention. The method 100 has application, for example, for digital data flow through telecommunications systems such as mobile telephone systems. The method 100 includes calculating (Step 110), for N values of input data, N write-control parameters each associated with one of M addresses of an output memory, directing (Step 120) each of the N values of input data to its associated address of the M addresses of the output memory in response to the N calculated write-control parameters, and reading (Step 130) the output memory to provide output data associated with the output data rate. Reading (Step 130) can entail reading M values from the M addresses of the output memory to provide the output data associated with the output bit rate.

The method can further include (as indicated by the dashed boxes in FIG. 1) storing (Step 105) the N values of input data at N addresses of an input memory, and reading (Step 106) the stored N values of input data prior to directing (Step 120) each of the N values of input data.

The method 100 is applicable to data rate conversion for data transmissions where N and M are different. Hence, there can be more or fewer values of N than the M addresses to which the N values are directed. If N is greater than M, some of the calculated (Step 110) N write-control parameters are associated with at least one shared address of the M addresses. If M is greater than N, all of the calculated (Step (Step 110)) N write-control parameters are associated with different addresses of the M addresses.

If N is greater than M, data values can be directed (Step 120) to shared addresses in various ways. Some addresses of the output memory will be used to store data associated with more than one of the input values. Thus, the number of units of input data can be reduced to accommodate the desired number of units of output data.

For example, directing (Step 120) can entail overwriting of shared addresses. In this case, values directed (Step 120) to the same address are written to that address, and overwrite one another as they arrive at the address. Alternatively, directing (Step 120) can entail storing a combination of values associated with two or more input values directed to the same shared address. For example, input values directed to a same shared address can be summed or averaged, or some other operation can be performed before storing the resulting value at the shared address.

If M is greater than N, alternative embodiments of the method 100 store different values at the output memory addresses that are not associated with one of the calculated (Step 110) N write-control parameters. In these embodiments, directing (Step 120) can entail storing, at each output memory address not associated with one of the N write-control parameters, a default value, an initial value, a value related to at least one of the input data values, or some other value not related to the input values.

For example, a default value, such as 1 or 0, can be stored at such addresses, or such addresses can be left unchanged. Alternatively, for example, duplicates of some of the N input values can be stored at some or all of such addresses.

The method 100 is applicable to systems that utilize data associated with bits having values of 0 and 1, and/or soft data, i.e., data that can assume more than two values. For simplicity, some of the example embodiments described herein refer to data in bit form, i.e., it takes only 2 possible values. It should be understood, however, that embodiments of the invention are not limited to data rate conversion of bit-based data.

The data rates accommodated by the method 100 can be associated with various portions of a system that involves data transmission and/or processing at different data rates in different portions of the system, for example, telecommunications systems, general networked systems, electronic systems that utilize clock-rate based data transmission, and other electronic systems that require data rate conversion.

A telecommunications system, for example, can be a mobile telephone system having nodes that transmit and receive data, such as mobile telephones, and transmission channels operating at different data rates than the telephones. For example, one standard associated with the UMTS provides that in a 10 millisecond period, a 384 Kilobits/sec dedicated traffic channel will have 11,580 coded bits to send, while a physical transmission channel can send 9,525 bits in the 10 milliseconds. In this example, the physical transmission channel is associated with radio waves. So, in this case, the method 100 can provide rate matching of an input rate associated with 11,580 bits to an output rate associated with 9,525 bits.

For example, the input data rate can be associated with a mobile telephone when acting as an uplink node, and the output data rate can be that of a transmission channel carrying a communication from the uplink node. Similarly, the input data rate can be that of the transmission channel, and the output data rate can be associated with the telephone when acting as a downlink node receiving the communication carried by the transmission channel.

More generally, a transmitting telephone can be associated with an input data rate, which can be matched via the method 100 to an output data rate of a channel, and a telephone receiving the communication can be associated with an output data rate, which can be de-matched relative to the input data rate associated with the channel to provide for the receiving telephone data having the same rate as that associated with the transmitting telephone. In some telecommunications systems, a "handshake" precedes a communication. For example, a node can receive a control word that identifies a channel configuration, for example, the data-rate of the channel. The node can then prepare itself for proper rate matching processing of the communication, according to principles of the invention.

The method 100 provides both bit-rate matching and de-matching. As understood by one having ordinary skill in the telecommunications arts, the companion use of bit-rate matching and de-matching permits transmitting and receiving nodes to interface with transmission media operating at a different bit-rate from that of the nodes.

Returning now to FIG. 1, the N write-control parameters can be, for example, write-pointers that point to addresses of the output memory. In this case, a write-pointer is calculated (Step 110) for each of the N input values. Alternatively, for example, the write-control parameters can themselves be addresses of the output memory. In this case, an address of the output memory is calculated (Step 110) for each of the N input values. In contrast to some prior methods, a write-control parameter is calculated (Step 110) for each of the N input data values so that each value can be directed to the output memory. A conditional test for each value, to determine if it will be written to an output memory, can thus be avoided.

For embodiments of the method 100 that utilize pointers for the N write-control parameters, calculating (Step 110) can entail incrementing a previous writer pointer to obtain a next write pointer. The N write pointers can then be sequentially determined, in part by sequentially incrementing a previous write pointer associated with one of the N values to obtain a next write pointer associated with another one of the N values.

As described in more detail below with reference to FIGS. 3a-3f and FIGS. 4a-4f, the increment value can be associated with the ratio of M to N.

The method 100 can be implemented, for example, in software, firmware or hardware (e.g. as an application-specific integrated circuit). The software may be designed to run on general-purpose equipment or specialized processors dedicated to the functionality described herein. A hardware implementation can include, for example, one or more integrated circuits.

Figure 2:
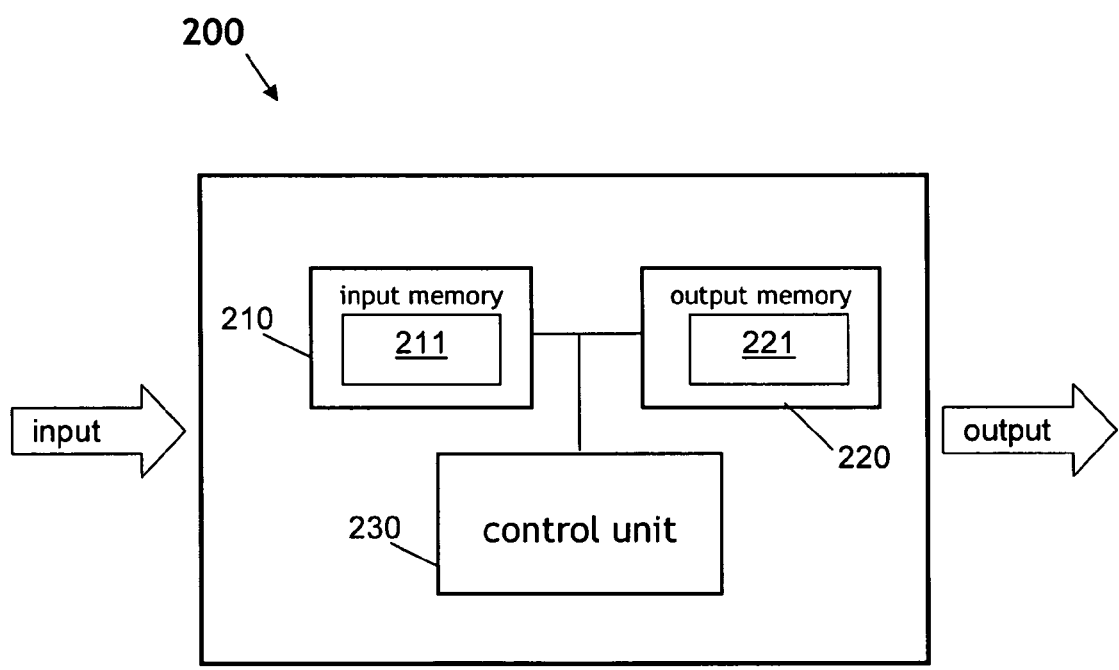
FIG. 2 is a block diagram of an embodiment of an apparatus for converting an input data rate associated with N units of data to an output data rate associated with M units of data, according to principles of the invention.

For example, FIG. 2 is a block diagram of an embodiment of a circuit 200 for converting an input data rate associated with N units of data to an output data rate associated with M units of data, according to principles of the invention. The apparatus 200 can implement the method 100. The apparatus 200 includes an input memory 210, an output memory 220 and a control unit 230.

The input memory 210 can include a register 211 to receive input data, and the output memory can include a register 221 to receive output data. The control unit 230 supports calculation of write-control parameters, and directing of input values to the output memory 220, according to principles of the invention.

One having ordinary skill in the circuit design arts will understand that the features of the circuit 200 can be modified while still implementing the method 100. For example, a single memory component can be used to provide both an input memory and an output memory.

The circuit 200 can be, for example a digital signal processor (DSP) implementing features of the method 100 via, for example, a software library. For example, one DSP suitable to implementation of features of the invention is the Tiger SHARC DSP manufactured by Analog Devices, Inc. (Norwood, Mass.) The circuit 200 can be located in, for example, a cellular telephone system station.

Referring next to FIG. 3a to FIG. 3f, the output memory can include one or more registers, and the input memory can include one or more input registers. The registers can be conventional memory registers as known to those having ordinary skill in the microprocessor arts. For example, the registers can be included in a processor such as a DSP that utilizes the method 100.

FIG. 3a to FIG. 3f are block diagrams of input and output registers in a temporal sequence that illustrates an example of calculating (Step 110) and directing (Step 120), according to one embodiment of the invention, where N is greater than M, i.e., the output rate is less than the input rate. In particular, FIG. 3a to FIG. 3f illustrate one alternative embodiment of the method 100 in which N write pointers are calculated to indicate N addresses to which N values are directed (Step 120) by writing the N values at the N addresses, some of which are shared. In this example, as described below, sequential values written to a same address overwrite a previous value.

Figure 3A:
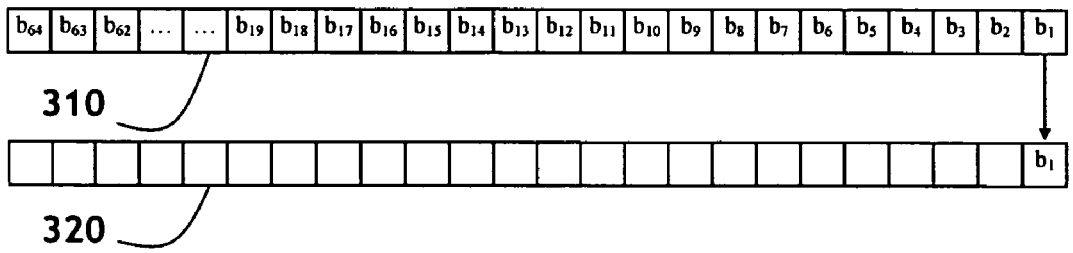
FIGS. 3a to 3f are block diagrams of input and output registers illustrating a temporal sequence of data rate matching by puncturing of some input data, according to one embodiment of the invention.

FIG. 3a illustrates 64 bits of an input register 310, where the bits are identified by 64 input memory addresses 1, 2, 3, ..., 64. The 64 bits have 64 stored values, labeled $b_1$, $b_2$, $b_3$, ..., $b_{64}$, as illustrated. The 64 stored values were stored (Step 105) from N received input values. The 64 bit register 310 of this example illustrates a typical register size. In this example, N can be equal to or greater than 64. Thus additional input registers can be used to accommodate values of N beyond the first 64 values, or the single input register 310 can be used in sequence to accommodate the N values beyond the first 64 values.

As described in the following, write pointers are calculated for each value stored in the input register 310, and each value is then written as directed (Step 120) by its calculated write pointer, to an address of the output register 320. An initial value of the write pointer ("write_ptr[1]") is set to 1, i.e., the initial write pointer (write_ptr[1]=1) points to the address of the first bit of the output register 320.

In this example, a read pointer is used to identify each bit of the input register 310 for its associated calculated write pointer. The initial value of the read pointer is set to 1 (read_ptr[1]=1). Thus, as shown in FIG. 3a, the value, $b_1$, in the first bit of the input register 310, identified by the initial read pointer (read_ptr[1]=1), is written to the first bit of the output register 320, identified by the initial write pointer (write_ptr[1]=1) associated with the first value stored in the input register 310. In other words, read_ptr[1]=1 and write_ptr[1]=1, so the value $b_1$ stored in address 1 of the input register 310 is read and then written to address 1 of the output register 320. Subsequent read pointers are determined by adding a value of 1 to the prior read pointer. This can be accomplished by defining a read pointer increment of value 1 (read_ptr_inc=1). Thus, for example read_ptr[2]= read_ptr[1]+read_ptr_inc. In alternative embodiments, the read pointers are not calculated.

For use in calculating (Step 110) subsequent write pointers (write_ptr[2], write_ptr[3], write_ptr[4], etc.), a write pointer increment ("write_ptr_inc") is defined as write_ptr_inc=1−(bit puncture ratio)=M/N. The value of the write pointer increment (write_ptr_inc) thus corresponds to the ratio of the output bit rate to the input bit rate by overwriting input data values in the output memory 320. In the example of FIG. 3a to FIG. 3f, the write pointer increment is set equal to 59/100 (i.e., write_ptr_inc=0.59.)

The write pointer for a value stored at a next address of the input register 310 is calculated (Step 110), in part, by utilizing the write pointer increment (write_ptr_inc) to obtain the next write pointer (write_ptr[n+1]) from the preceding write pointer (write_ptr[n]). As described below, in this illustrative embodiment, the write pointer increment is used indirectly to increment the write pointer.

An increment factor, i[n], and the write_ptr[n], n a positive integer, are defined, for this embodiment, as follows, $$i[1]=(\text{init}-1)/100=(70-1)/100=0.69,$$

$$i[n+1]=\text{fractional part of }(i[n]+\text{write\_ptr\_inc}), \text{ and}$$

$$\text{write\_ptr}[n+1]=\text{write\_ptr}[n]+\text{integral part of }(i[n]+\text{write\_ptr\_inc}).$$

The value "init" (arbitrarily given the value 70 in this example) can be selected, for example, in response to a communications standard to determine which input values are punctured. Direct selection of a value for i[1], i.e., to initialize the increment factor, can also serve this purpose.

For the example illustrated in FIG. 3a to FIG. 3f, the write pointer increment, as described above, is set equal to 0.59, as follows:

$$\text{write\_ptr\_inc}=1-41/100=0.59.$$

Figure 3B:
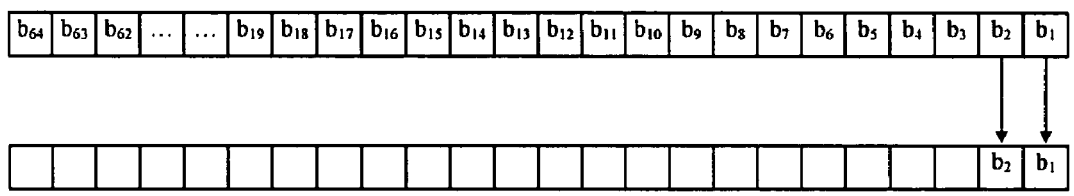

Thus, 41 of each 100 bits of input data will be punctured to provide output data having an output data rate. As illustrated in FIG. 3b, the write pointer for the value stored at the second address of the input register (i.e., indicated by read_ptr[2]=2) is determined to be write_ptr[2]=write_ptr[1]+integral part of (1.28)=2. Thus, the value $b_2$ is written to address 2 of the output register.

Figure 3C:
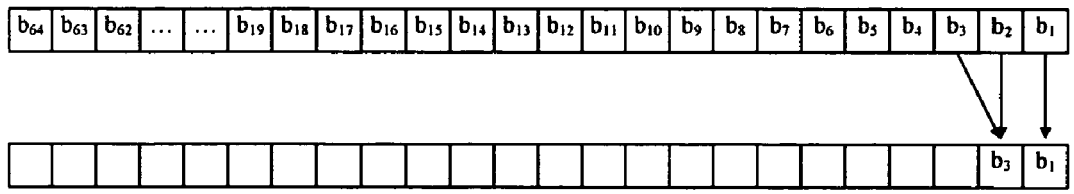

As illustrated by FIG. 3c, the increment factor is updated for calculation (Step 110) of the next write pointer, i.e., $i[3]$=fractional part of $(i[2]$+write_ptr_inc$)$=0.28+ 0.59=0.87, and the write pointer for the third input value is determined, i.e., write_ptr[3]=write_ptr[2]+integral part of (i[2]+write_ptr_inc)=2+0=2. Thus, the value $b_3$ from address 3 of the input register 310 overwrites the value $b_2$ that was previously stored at address 2 of the output register 320. In effect, the input data value $b_2$ is punctured.

Figure 3D:
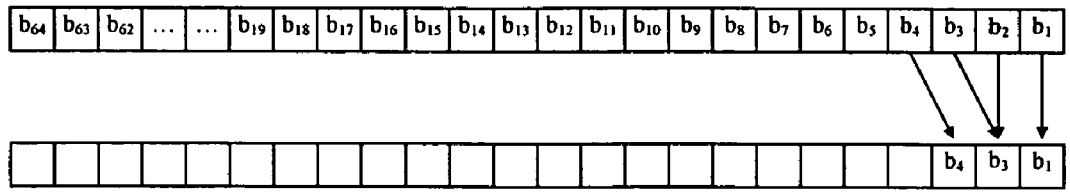

As illustrated by FIG. 3d, the increment factor is again updated for determination of the next write pointer, i.e., i[4]= fractional part of (i[3]+write_ptr_inc)=0.46. The next write pointer is write_ptr[4]=write_ptr[3]+integral part of 1.46=3. The value $b_4$ from address 4 of the input register 310 is written to address 3 of the output register 320.

Figure 3E:
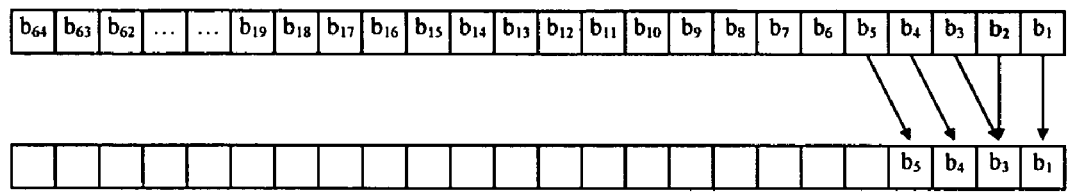

Similarly, as illustrated by FIG. 3e, the increment factor is updated for determination of the next write pointer, i.e., i[5]= fractional part of (i[4]+write_ptr_inc)=0.05. The next write pointer is write_ptr[5]=write_ptr[4]+integral part of 1.05=4. The value $b_5$ from address 5 of the input register 310 is written to address 4 of the output register 320.

Figure 3F:
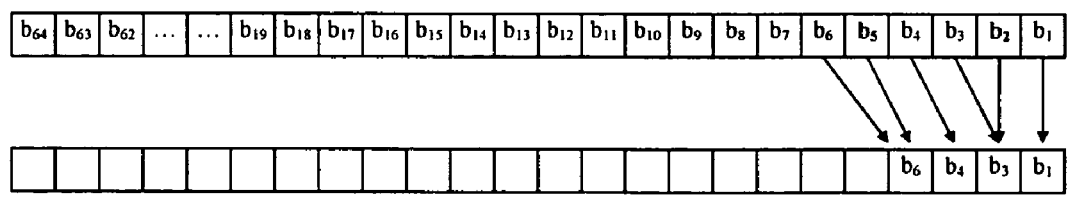

As illustrated in FIG. 3f, the increment factor is updated, i.e., i[6]=fractional part of (i[5]+write_ptr_inc)=0.05+ 0.59=0.64, and the write pointer for the sixth input value is determined, i.e., write_ptr[6]=write_ptr[5]+integral part of (i[5]+write_ptr_inc)=4.

Thus, the value $b_6$ from address 6 of the input register 310 overwrites the value $b_5$ that was previously stored at address 4 of the output register 320. In effect, the input data value $b_5$ is punctured. Further writing of input values from the input register 310 to the output register 320 can continue in subsequent steps.

The above-described incrementing of the write pointer in effect causes the write pointer to progress more slowly, on average, than the read pointer. That is, while the read pointer progresses in increments of 1 along addresses of the input register 310, the write pointer, on average, correspondingly progresses in increments of M/N along addresses of the output register 320.

Now referring to FIG. 4a to FIG. 4f, the method 100 can also provide matching of an input data rate to a larger output data rate. In this case, the write pointer progresses more rapidly, on average, than the read pointer. Similar to FIG. 3a to FIG. 3f, FIG. 4a to FIG. 4f are block diagrams of input and output registers 410, 420 in a temporal sequence that illustrates an example of calculating (Step 110) and directing (Step 120), according to principles of the invention, where N is now less than M, i.e., the output rate is greater than the input rate. FIG. 4a to FIG. 4f illustrate a process occurring for one alternative embodiment of the method 100, in analogy to FIG. 3a to FIG. 3f, in which N write pointers are calculated to indicate N addresses to which N values are directed (Step 120) by writing the N values at the N addresses, none of which are the same address. In this example, as described below, input values are repeated in addresses of the output register 420 without an associated calculated write pointer.

Figure 4A:
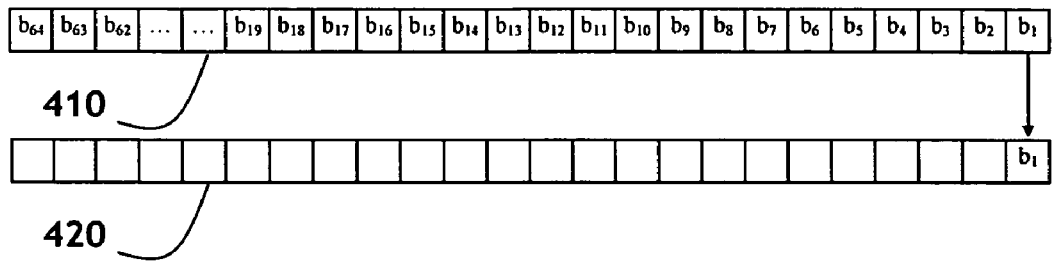
FIGS. 4a to 4f are block diagrams of input and output registers illustrating a temporal sequence of data rate matching by repeating some input data, according to one embodiment of the invention.
Figure 4B:
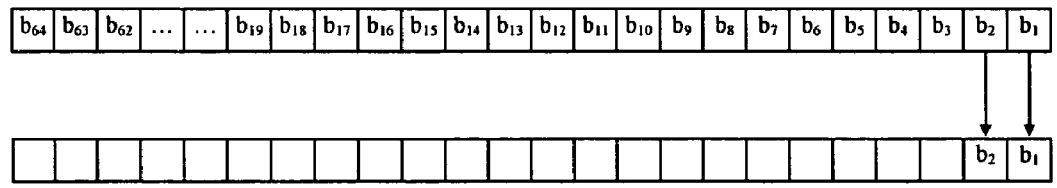
Figure 4C:
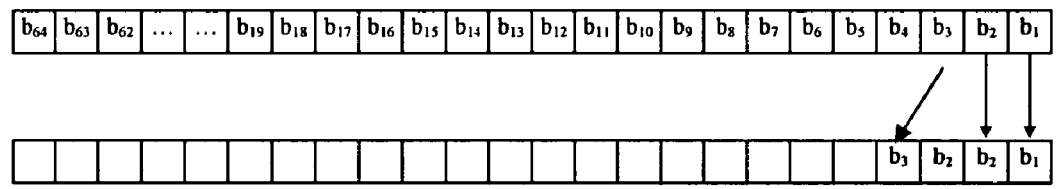
Figure 4D:
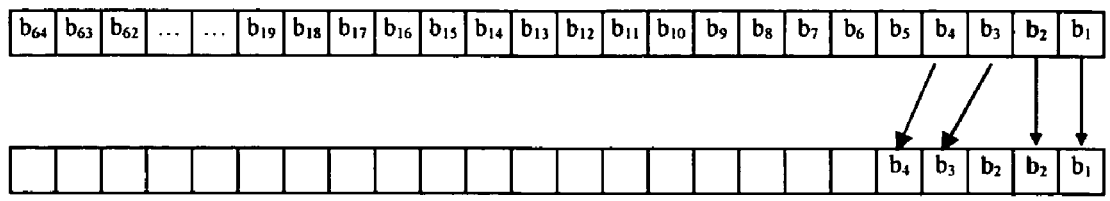
Figure 4E:
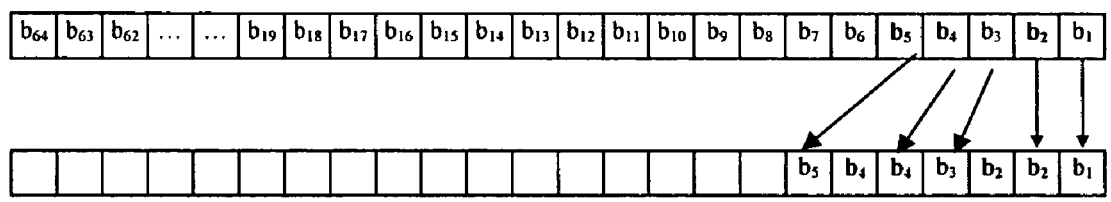
Figure 4F:
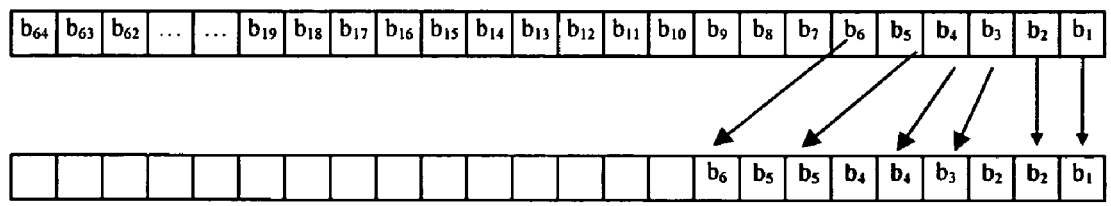

FIG. 4a illustrates 64 bits of an input register 410, identified by 64 addresses 1, 2, 3, . . . , 64, and 64 bits of an output register 420, also having 64 addresses. The 64 bits of the input register 410 have 64 stored values, labeled $b_1, b_2, b_3, \ldots, b_{64}$, as illustrated. The 64 stored values were stored (Step 105) from N input values.

Each of FIG. 4a to FIG. 4f illustrate writing of one of the first six values stored in the input register 410 to an address of the output register 420. Addresses of the output register 420 not directly associated with any write pointer are filled, in this example, via a sign extension process.

Here, the ratio of N to M is 50:80. Thus, in this example, 30 of every 50 bit values written to the output register 420 are repeated values. The calculation of write pointers for this example can be described as follows. An increment parameter, write pointer increment, write pointer, and initial values are, $j[1]$=(50−init)/50=(50−45)/50=0.10, write_ptr_inc=30/50=0.60, $j[n+1]$=fractional part of $(j[n]$+write_ptr_inc), i.e, $j[n+1]$=fractional part of $(j[n]$+0.60), write_ptr[1]=1, and write_ptr[n+1]=write_ptr[n]+1+integral part of $(j[n]$+ 0.60).

Six calculated write pointers and their effect on writing of input values to the output register 420 are illustrated in the six figures of FIG. 4a to FIG. 4f.

In the example of FIG. 4a to FIG. 4f, the addresses of the output register 420 that do not have an associated write pointer are filled with repeated values of some of the input values. This is accomplished, for example, by a process of sign-extension. That is, as each value is written to an address of the output register all higher numbered addresses are filled with the same value. Thus, as illustrated, addresses to which no value is directly written hold the same value as that of the preceding address.

The method 100 can be used to improve the rate matching performance of some prior telecommunications systems. For example, the 3GPP Technical Specification 25.212, Section 4.2.7.5 titled "Rate matching pattern determination," provides a rate matching pattern determination procedure that performs a conditional test for each incoming bit of data to determine if the bit should be punctured or repeated. The method 100 permits elimination of this conditional test, and a related increase in efficiency of, for example, better than 50%.

The method 100 can accommodate changing input and/or output data rates. A write pointer increment can be updated in response to a data-rate change.

The method 100 can also accommodate errors related to electronic storage of data. For example, in the example of FIG. 3a to FIG. 3f, the write pointer increment is set equal to 0.59. Error can be introduced into the value 0.59 when expressed, for example a as 32-bit unsigned fixed point, as can be implemented via software, as will be understood by one having ordinary skill in the electronic circuit arts. In some hardware storage implementations of the invention, the error can be smaller.

For example, this error to represent 0.59 (by a 32 bit unsigned fixed point) can be on the order of approximately $10^{-11}$. During the calculation of write control parameters, this error can accumulate. With sufficient accumulation, an error in the puncturing or repeating of data can occur. For common data rates, for example, up to about 28 Kbit, the error can be ignored since the accumulated error can be accommodated without causing an error in rate matching.

When error accumulation is of concern, for example at some higher data rates, the method 100 can include a reinitialization process to periodically remove accumulated error. For example, calculating (Step 110) can include a reinitialization process that occurs when a threshold number of write parameter calculations is reached.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for converting a telecommunications system input data rate associated with N units of data to an output data rate associated with M units of data, comprising:
    calculating, for N values of input data, N write-control parameters each associated with one of M addresses of an output memory;
    directing each of the N values of input data to its associated address of the M addresses of the output memory in response to the N calculated write-control parameters; and
    reading the output memory to provide output data associated with the output data rate, wherein, if N is greater than M, some of the N write-control parameters are associated with at least one shared address of the M addresses, and, if M is greater than N, all of the N write-control parameters are associated with different addresses of the M addresses.

2. The method of claim 1, wherein each of the N write-control parameters is an address of the M addresses.

3. The method of claim 1, wherein the N write-control parameters comprise N write pointers, and calculating comprises incrementing a previous writer pointer to obtain a next write pointer.

4. The method of claim 3, wherein calculating further comprises incrementing the previous writer pointer by an increment value associated with the ratio of M to N.

5. The method of claim 4, wherein calculating further comprises updating the increment value in response to a change in the ratio of the input bit rate to the output bit rate.

6. The method of claim 4, wherein calculating further comprises initializing the increment value in response to a bit-rate matching standard.

7. The method of claim 1, wherein, if N is greater than M, directing comprises overwriting the at least one shared address, or storing, at the at least one shared address, a mathematical combination of values directed to the at least one shared address.

8. The method of claim 1, wherein, if M is greater than N, directing comprises storing at each output memory address not associated with one of the N write-control parameters a default value, an initial value, or a value related to at least one of the input data values.

9. The method of claim 1, further comprising storing the N values of input data at N addresses of an input memory, and reading the stored N values of input data prior to directing each of the N values of input data.

10. The method of claim 1, wherein the output memory comprises at least one output register, and the input memory unit comprises at least one input register.

11. The method of claim 10, wherein the output memory comprises more than M bits.

12. The method of claim 10, wherein the output memory comprises fewer than M bits.

13. The method of claim 1, wherein the at least one shared address of the M addresses of the output memory includes at most N minus M addresses.

14. The method of claim 1, wherein calculating comprises reinitializing a first write-control parameter of the N write-control parameters in response to the output data rate being greater than a threshold data rate.

15. The method of claim 1, wherein the input data rate is associated with a node acting as an uplink node or a downlink node of the telecommunications system.

16. The method of claim 1, wherein the input data rate is associated with a node sending a transmission via a channel, and the output data rate is associated with the channel carrying the transmission.

17. The method of claim 1, wherein the input data rate is associated with a channel carrying a transmission, and the output data rate is associated with a node receiving the transmission via the channel.

18. The method of claim 1, wherein reading comprises reading M values from the M addresses of the output memory to provide the output data associated with the output bit rate.

19. The method of claim 1, wherein, if M is greater than N, directing comprises sign-extending at least one of the N values of input data to overwrite each output memory address not associated with one of the N write-control parameters.

20. The method of claim 1, wherein the input data is associated with bits having values of 0 and 1.

21. The method of claim 1, wherein the input data is associated with soft data having more than two different values.

22. An integrated circuit configured to perform the method of claim 1.

23. An apparatus for converting an input data rate associated with N units of data to an output data rate associated with M units of data, comprising:
    means for calculating, for N values of input data, N write-control parameters each associated with one of M addresses of an output memory;
    means for directing each of the N values of input data to its associated address of the M addresses of the output memory in response to the N calculated write-control parameters; and
    means for reading the output memory to provide output data associated with the output data rate,
    wherein, if N is greater than M, some of the N write-control parameters are associated with at least one shared address of the M addresses, and, if M is greater than N, all of the N write-control parameters are associated with different addresses of the M addresses.

24. A method for converting N values of data to M values of data, comprising:
    calculating, for the N values of data, N write-control parameters each associated with one of M addresses of a memory;
    directing each of the N values of data to its associated address of the M addresses of the memory in response to the N calculated write-control parameters; and
    reading the memory to provide the M values of data,
    wherein, if N is greater than M, some of the N write-control parameters are associated with at least one shared address of the M addresses, and, if M is greater than N, all of the N write-control parameters are associated with different addresses of the M addresses.

* * * * *